United States Patent [19]

Nilsson et al.

[11] Patent Number: 4,613,376
[45] Date of Patent: Sep. 23, 1986

[54] ASPHALT SURFACING MASS

[75] Inventors: Nils-Olov Nilsson, Lerum; Ingmar Andersson, Gothenburg; Ulrik Sandberg, Skövde; Eils Karlsson, Axvall, all of Sweden

[73] Assignee: Laxa Bruk AB, Sweden

[21] Appl. No.: 765,165

[22] Filed: Aug. 12, 1985

Related U.S. Application Data

[63] Continuation of Ser. No. 330,698, Dec. 14, 1981, abandoned.

[51] Int. Cl.[4] ............................................. C08L 95/00
[52] U.S. Cl. ................................ 106/282; 106/281 R; 106/279
[58] Field of Search .................... 106/281 R, 282, 279; 427/138

[56] References Cited

U.S. PATENT DOCUMENTS

| | | | |
|---|---|---|---|
| 3,615,804 | 10/1971 | Defregger et al. | 106/282 |
| 3,617,329 | 11/1971 | Goff | 106/282 |
| 3,808,164 | 4/1974 | Gulino et al. | 106/282 |
| 3,868,263 | 2/1975 | McConnaughay | 106/282 |
| 3,870,426 | 3/1975 | Kietzman et al. | 106/282 |
| 4,052,219 | 10/1977 | Marrs et al. | 106/282 |

Primary Examiner—Amelia B. Yarbrough
Attorney, Agent, or Firm—Larson and Taylor

[57] ABSTRACT

A surfacing mass especially for outdoor use and mainly comprising a mixture of asphalt and a stone material having a low content of fine material. The mixture comprises a little amount of fibres of a type which is not solved or softens in the asphalt, preferably mineral fibres. The fibre material has an average diameter of between 1 and 5 $\mu$m and is added in an amount of between 0.5 and 20% by weight calculated on the amount of asphalt. The invention also relates to a method of manufacturing such surfacing mass at a mixing temperature of 140°–170° C. or preferably 150°–160° C. both for the asphalt and the stone mass. Preferably the fibre material is admixed in the asphalt before the mixing thereof with the stone material. The fibre material may be admixed in the asphalt at an asphalt temperature which is higher than the mixing temperature for asphalt and stone material.

7 Claims, No Drawings

ASPHALT SURFACING MASS

This application is a continuation of application Ser. No. 330,698 filed Dec. 14, 1981, now abandoned.

The present invention relates to a surfacing mass especially for streets, roads, parking places etc., which is based on asphalt and which among other things comprises a stone material having a low content of fine particle material. The invention also relates to a method of manufacturing such surfacing mass.

The present general high speeds of road vehicles have caused a demand that rain water quickly disappears from the surface of the road. The most serious consequences of water on the road surface is water planing, whereby the tire is separated from the road surface by a film of water. Waterplaning may appear already at relatively low speeds and is considered to be the reason for numerous serious traffic accidents. Also in other ways water on the road surface may cause difficulties for instance in that the vehicle tires splashes water that impairs the sight. A reasonably quick run off of water may be obtained that the road is formed cambered but depending on where, especially when using tire pegs, and depending on the packing and deformation that heavy traffic causes lowered wheel tracks appear in which water may be collected in spite the road is cambered.

The water filled wheeltracks of course increases the risk of water planing and may upon sudden temperature changes in the winter be transformed to dangerous ice areas. Another problem which in particular has appeared when setting up large asphalt or concrete surfaced parking places is that such surface coverings involve disturbances in the natural percolation or the natural drainings. The rain water is not capable of penetrating the tight coverings and is not returned at subsoil water but is collected as surface water which in turn must be drained and often also must be cleaned. Even if there is normally no problems involved in water planing at parking places, such places ought to be as waterfree as possible since people have to walk there.

One solution to the said problems has been to provide the water surface, the parking place or similar with a covering having a large amount of cavities so that the covering thereby becomes water pervious. In such surfacing masses which comprises a stone material having asphalt as a binder and which consequently comprises a coarse portion of material and a fine portion of material the surfacing mass has been given a low amount of fine material so that the masses obtain a large number of communicating cavities. Since thereby only a part of the volume of the cavities or the stone material is filled with asphalt or any other fine material there is a remainder of cavity volume in the ready surfacing mass. For well drained masses such a cavity volume is at least 15-25% which amount should be compared with normal non-drained surfacing masses which according to actual (Swedish stipulations) should have a cavity volume of 2-6%.

The experiences of such so called open grades asphalt friction courses have shown that such masses apart from the said draining property also have other good properties. Among such properties is noted that the masses in combination with rubber tires give a high friction and a silent run. Road markings have better visibility and have a longer lifetime against wear. Especially at nights wet surfacings of this type give less reflexes than the conventional tight surfaces.

Open grades asphalt friction courses, however, involve certain disadvantages. Depending on its porosity open grades asphalt friction courses cannot be provided anywhere, for instance not on cracked substrates. The surface covering also necessitates that particular rules are considered. At places where so called open grades asphalt friction courses have been applied, however, generally positive experiences have been met with.

The manufacture of such drained surfacing masses, however, involve large problems. At normal temperature for mixing the stone mass and the asphalt, which for asphalt having the temperature designation A-120 or A-135 (at 500 cSt) is 150°-160° C. the asphalt flows off the stone since there is not sufficient amount of fine grain material for keeping the thinly fluid asphalt. Such flow off of the asphalt sometimes leads to "degraining" or segregation at handling, transport and surface covering since the coarse grains are separated from fine grains thereby causing so called stone loss in the ready surface covering, all depending of the fact that the surfacing mass cannot be made to contain sufficient amount of asphalt.

For solving this problem attempts have been made to make the mixture at lower temperatures. It has shown that such little run off of asphalt from the stone material is obtained at a mixing temperature of 115°-120° C. that the drained surfacing masses can be made which have such high amount of asphalt that there is no substantial degraining or no substantial stone loss. The low mixing temprature however, has involved new problems. For eliminating the influence of remaining moisture in the stone material which prevents the asphalt from wetting the stone surfaces it is among other things necessary to add some wetting improving means. For this purpose so far certain amins, for instance an alcyle amin like LILAMIN VP75 has been added in an amount of about 0.4% as calculated on the amount of asphalt. The amines, however, give an unpleasent smell, both when manufacturing the asphalt in the asphalt mill and when applying the surfacing masses.

Also hydrated lime has been used in an amount of for instance 1.5% as calculated on the stone material for eliminating the remaining moisture of the stone material. Since, however, both amines and hydrated lime are classified as dangerous substances particular measurements of safety must be considered when using such substances. The lower mixing temperature for asphalt and stone material also necessitates a time consuming and expensive readjustment of the asphalt mill. Also the surfacing mass mixed at low temperature shows an unfavourable tendency to late packing or late compressing what especially during summers at heavy traffic load shows both in that relatively strong wheel tracks appear and in that the late packed part of the surfacing gets a tightening especially of the surface to the effect that the draining property of the surfacing is reduced just where such property would be of best need.

It has previously been suggested to increase the viscosity of the asphalt binder by adding a fine grained filler material. According to the Swedish Pat. No. 211,163 an especially large effect per part of weight is obtained if the filler material is a mineral fiber having a diameter of 5-15 μm. If the viscosity is increased by adding a filter material there is a less run off of asphalt from the stone material, but it has appeared self explanatory to the expert that an increase of viscosity by admixing a filler material would give the same post-packing problems as an increase of viscosity by lowering the temperature. The method suggested in the said patent therefore has not been used to any substantial extent.

Now it has surprisingly shown that both the above mentioned problems may be solved by using mineral fibres of special dimensions, viz. the problem of avoiding asphalt run off from the stone material and to avoid the troublesome post-packing problem and this is possible even when mixing the surfacing mass at the normal asphalt mixing temperatures of 150°–160° C. It has shown that it is possible if a sufficient large amount of fibre material having sufficiently thin fibres is admixed in the asphalt phase and the mixing is made at the normal asphalt mixing temperature of 150°–160° C. The adhesion between asphalt and stone material is not influenced by the admixing of fibres and this means that no particular adhesion improving substances have to be added. Since the mixing temperature is kept at normal levels no time consuming and complicated readjustments have to be made in the asphalt mill and it has shown that the surfacing mass of the above mentined type gives fully acceptable values as concerning the post packing or post compressing. Thereby the above mentioned problem of tightening of the covering surface and thereby the reduced draining property depending on the pressure from the vehicle tires are eliminated or substantially reduced.

Apart from the demand that the added filler material should have a predetermined small average diameter it is also a need that the fibres should be resistent and should not become softened at the actual mixing temperature. It has shown that particularly good results are obtained by means of mineral fibres having an average fibre diameter which is less than 5 μm and more than 1 μm.

Tests have shown that fibres which are coarser than 5 μm have not a sufficient viscosity increasing effect and also obvious not reinforcing effect to the binder film. The latter disadvantage may possible be explained in that the fibres to a too large extent tends to orientate parallelly to the stone and thereby also to the plane of the binder film.

If on the other hand a less average fibre diameter than 1 μm is used the viscosity is indeed influenced, but the reinforcing effect is bad. Obviously there is an area of 1–5 μm for the average fibre diameter which seems to be an optimum.

It has also shown advantageous that the mineral fibres are made to appear separated from the other in the asphalt phase so as not to form knots or tots. The formation of such knots or tots may be pervented by admixing the fibres in a suitable way and by pre-treating the fibres with some substance which simplifies for the asphalt to wet the fibre surface. For this purpose wetting agents known per se like cationic tensides may be used. The asphalt wetting of the fibre surfaces also may be facilitated in that all moisture is removed from the fibres by drying the fibres before the admixture thereof to the asphalt mass.

The admixing of the fibre material preferably is made into the asphalt before the stone material is added. A good and tot free admixing may be obtained if the asphalt in connection to the admixing of the fibres is heated to a temperature of for instance 20°–40° C. over the normal temperature for admixing the stone material, and in that the asphalt-fibre mixture before the stone material is added is cooled to the said normal stone material admixing temperature. The said temporary temperature increase gives a particularly good effect in the case that the wetability between asphalt and fibres is improved in that the fibre surfaces are treated with some wetting agent or in that the fibres are dried. Depending on the risk of fire at the increased temperature the process ought to be accomplished in closed state.

To summarize the invention relates to a surfacing mass based on asphalt and a method of manufacturing such a surfacing mass which has draining properties and which comprises a stone material having a low amount of fine material and having asphalt as a binder. In the method according to the invention the admixture of stone material is made at a temperature for the asphalt of 150°–160° C. and in the presence of 0.5–20% by weight calculated on the amount of asphalt of a fibreous material which is not dissolved or softens in the asphalt. Tests have proved that a sufficient effect for being technically-economically interesting is not obtained if the fibrs are present in an amount of less than 0.5%, that is such low amount of fibres cannot justify the admixing costs and the fibre costs. Further tests have shown that higher fibre amounts than 20% do not give improved properties corresponding to the increased costs for the increased amount of fibres.

In the following some examples of the invention will be given. It is, however, to be understood that the examples are only of illustrating nature and that the invention is not restricted but by the appended claims.

EXAMPLE 1

In a batch mixing mill asphalt masses was introduced 3,144 kg of a stone material having the following average size composition:

| <2 mm | 7% |
|---|---|
| 2–4 mm | 18% |
| 4–8 mm | 24% |
| 8–12 mm | 51% |
| >12 mm | 0% |

The stone material was heated to 160° C. 160 kg asphalt having the denomination temperature of A 135 was added at 160° C. by means of 40 nozzles. Shortly before the introduction of the asphalt the stone material was mixed with 32 kg mineral fibres of the type having the trade name INORPHIL 057 by the manufacturer Rockwool AB. INORPHIL 057 is a mineral fibre material having an average fibre diameter of about 3 μm and in which the main part of the fibres has a fibre diameter within the area of 1–5 μm. For characterizing the length of the fibres there are no acceptable direct methods. Instead thereof preferably the so called thickening number ($n_f$) is measured, which number is $$n_f = \frac{\bar{\eta} - \eta_o}{\eta_o}$$

in which $\bar{n}$ is the viscosity of a slurry of 0.5 g dry fibres in in 200 g ml ethylene glycol at 20° C. and in which $\eta_o$ is the viscosity of the same ethylene glycol without fibres also at 20° C. and measured by means of the same measuring equipment, which is a Brookfield viscosimeter having a spindle LV1 or corresponding. For INORPHIL 057 a thickening number of 1.8–6.0.

After the mixing was finished the mass was taken out and the run off of asphalt from the stone material was observed and judged. The judging which was made according to the following scale proved to have a clearly acceptable result, point B in the following. The post packing was judged to be low for a draining surfacing mass of this type and showed to correspond normal post packing for conventional non-draining surfacing masses. The run off of asphalt from the stone material was determined in the following way:

100 grammes of the mass was taken out and was placed at a minimum of handling on a circular heat resistant glass plate having a diameter of 203 mm. The glass plate was placed in a heat box at 160° C. and was observed from underneath for 60 minutes. The following judging scale was used:

A: Asphalt only in the contact point between stone and glass;
B: Small asphalt dabs in each contact point;
C: Several large asphalt dabs in some of the contact points;
D: Large asphalt dabs in each contact point.

EXAMPLES 2–5

The same method was used as in example 1 with the difference that 16, 6.4, 1.3 and 0.65 kg mineral fibres respectively of the type INORPHIL 057 was added. The result is shown in the table underneath. It is evident that a less addition of mineral fibres than about 0.5% gave an unsufficient run off and in addition thereto a non-satisfactory value of post packing of the ready asphalt mass.

EXAMPLE 6

In a batch mixing mill for asphalt masses 3,158 kg of a stone material having the same distribution of size as in example 1 was introduced. The stone material was heated to 160° C. Separately and concurrently therewith 166 kg asphalt having the denomination temperature A 135 was heated to 160° C. and to the heated asphalt was added 16 kg mineral fibres of the same type as in example 1. The asphalt and the mineral fibres was mixed and was added at maintained temperature to the heated stone material, and all ingredients were mixed.

The run off was observed and judged in the same way as in example 1. In spite of the less amount of mineral fibres the surfacing mass proved to have the same run off and post packing properties as in example 1.

EXAMPLES 7–8

The same method was repeated as in exampel 6 with the difference that instead of 6.4 kg mineral fibres was now added 1.3 and 0.65 kg respectively of mineral fibres of the same type as in example 6. The result is shown in the following table. It is evident that also in this case a less amount of mineral fibres than 0.5% gives an unsatisfactory result.

EXAMPLE 9

The method according to example 6 was repeated but with the difference that the asphalt was heated to 190° C. before the admixing of the mineral fibre and in this case was added mineral fibres of the type INORPHIL 057 in the same amount as in example 6. The mixture of asphalt and mineral fibre was cooled to 160° C. before the mixing together with the stone material.

The result is shown in the table.

EXAMPLES 10–11

The method according to example 9 was repeated, but in this case was added 1.3 and 0.65 kg mineral fibres respectively. The result shown in the table confirms that mineral fibres in an amount less than 0.5% as calculated on the amount of asphalt is an unsatisfactory result.

The run off was observed and judged in the same way as in the previous examples, and the surfacing mass showed to have the same good properties as in the previous examples.

By the extra heating of the asphalt mass in connection to the admixing of the mineral fibres consequently the amount of mineral fibres could be further reduced without obtaining impaired properties of run off and post packing.

EXAMPLE 12

For a comparing analyzis the method of claims 1–5 was repeated, but instead of the mineral fibres INORPHIL 057 was added mineral fibres having an average fibre diameter of 6–8 $\mu$m. The run off and post-packing properties were observed in the same way as in the previous examples. The coarse fibre was manufactured by separating away all unfibrated material from coarse fibres basalt wool and a part of the fibres less than 5 $\mu$m. The run off showed to be larger than in examples 1–5 and was judged to be non-acceptable (D), see the following table.

EXAMPLE 13

The method according to claim 1 was repeated but with a mineral fibre material the average fibre diameter of which was less than 1 $\mu$m. The run off and post packing properties were observed, and the run off proved to be non-acceptable (E) and the post packing properties were essential higher than in examples 1–5.

The following table clearly proves the connection between the fibre size and the run off appearance of the asphalt-stone-fibre material and thereby also the connection between the fibre size and the porosity and the waterperviosity of the ready surfacing mass. It is thus clearly evident that fibres having a larger diameter than about 5 $\mu$m give an impaired run off value than fibres within the area of 1–5 $\mu$m.

TABLE

| Example | Type of Fibre | Amount of Fibre kg | % asphalt | Run Off | Post-packing |
|---|---|---|---|---|---|
| 1 | INORPHIL 057 | 32 | 20 | A | Normal |
| 2 | " | 16 | 10 | B | Normal |
| 3 | " | 6.4 | 4.0 | C | Normal |
| 4 | " | 1.3 | 0.8 | D | Some tendency |
| 5 | " | 0.65 | 0.4 | E | Obvious tendency |
| 6 | INORPHIL 057 | 6.4 | 4.0 | B | Normal |
| 7 | " | 1.3 | 0.8 | C | Normal |
| 8 | " | 0.65 | 0.4 | D/E | Some tendency |
| 9 | INORPHIL 057 | 6.4 | 4.0 | B | Normal |
| 10 | " | 1.3 | 0.8 | C | Normal |
| 11 | " | 0.65 | 0.4 | D | Some tendency |
| 12 | Coarse fibres | 16 | 10 | D/E | Some tendency |
| 13 | Ground IN. 057 | 16 | 10 | E | Obvious tendency |

We claim:
1. A surfacing mass for streets, roads, parking places and the like having a draining activity comprising a mixture of a stone material, asphalt, and about 0.5 to

20% by weight of fibers having an average fiber diameter of about 1 and 5 μm, said fibers being pretreated with a cationic tenside wetting agent and said stone material comprising a course portion of material and a small portion of fine material in proportions that provide a surfacing mass having communicating cavities for draining, whereby the stone material mainly comprises stone particles having an average diameter of between 2 and 12 mm and in which about 50% of the stone material has an average particle size of between 8 and 12 mm.

2. Method of manufacturing the surface mass of claim 1 having draining activity comprising mixing a stone material with asphalt at a temperature of 140°–170° C. in the presence of 0.5–20% by weight of a fiber material of a type which does not dissolve or soften in the asphalt, said stone material comprising a course portion of material and a small portion of fine material in proportions that provide a surfacing mass having communicating cavities therein for draining.

3. Method according to claim 2, wherein the fiber material is a mineral fiber having an average diameter which is less than 5 μm and larger than 1 μm, and in that the mineral fibers are admixed so as to become substantially evenly distributed and separated from each other in the asphalt phase.

4. Method according to claim 2, wherein the fiber material is admixed in the asphalt before the asphalt is mixed with the stone material.

5. Method according to any of claims 4, wherein the fiber material is treated with a wetting agent before the fiber material is admixed in the asphalt phase.

6. Method according to any of claims 5 wherein the fiber material is completely dried before being admixed in the asphalt phase.

7. Method according to claim 5 wherein the asphalt is heated to a temperature of about 20°–40° C. over the mixing temperature for asphalt and stone material before the fiber material is admixed in the asphalt, and in that the mixture of asphalt and fiber material is cooled to the temperature of the stone material and is mixed with the stone material.

* * * * *